3,124,547
PROCESS OF CONTACTING A MICROPOROUS RESIN WITH A PLASTICIZER AND SUBSEQUENTLY REMOVING SAID PLASTICIZER

Theodore H. Meltzer, Yardley, and Howard J. Strauss, Abington, Pa., assignors to The Electric Storage Battery Company, a corporation of New Jersey
No Drawing. Filed Sept. 11, 1961, Ser. No. 137,049
3 Claims. (Cl. 260—2.5)

The present invention generally relates to the production of improved microporous materials. More particularly, the present invention is concerned with materials which by virtue of their microporosity are particularly adapted to permit the passage of water and other liquids and to prevent the passage therethrough of solids. By virtue of these properties, these materials are highly desirable and extremely useful as filtering media.

Microporous materials have heretofore been produced by the techniques set forth in U.S. Patent No. 2,542,527, issued February 20, 1951, to E. M. O'C. Honey et al. Disclosed in this patent is a method of producing microporous materials which comprises the incorporation of a soluble, inert, finely divided solid pore-forming agent such as starch, sugar, or a suitable salt into a mix of powdered polyvinyl chloride and a temporary plasticizer, the pore-forming agent being incompatible with both the resin and plasticizer. The mix is then sheeted or otherwise shaped as by calendering or extruding and the plasticizer removed by evaporation. Following the removal of the plasticizer, the starch or other pore-forming agent is swelled in situ and removed, leaving a plurality of uniformly dispersed pores or micropores the size of which depend for the most part upon the size of the pore-former utilized. Although eminently suited for the production of microporous materials of certain types, the products of the Honey et al. process have been found to have a high degree of repellency for liquids and, hence, to be poorly suited for filtering applications.

It is an object of the present invention to provide a means for further treating microporous material of the type described to enhance its water permeability without a substantial decrease in its ability to retain solids.

It is another object of the present invention to produce a new and improved filtering material characterized by a high degree of chemical resistivity and improved properties for the differentiation between the passage of liquids and solids and between liquids of different viscosities.

In accordance with the present invention, microporous materials, preferably in sheet form, prepared in accordance with the teachings of the aforementioned Honey et al. patent, are post-treated with a plasticizer which is subsequently removed. This post-platicization of the microporous material has been found to increase by a factor of 10 or more the ability of the material to transmit water or other liquids. This increased ability to transmit water is achieved without any substantial increase in the pore size of the material as measured by its ability to transmit air and water vapor.

While the mechanism which makes possible this increase in the ability of the material to transmit liquids is not fully understood, it is believed that it can be attributed to a change in the surface characteristics of the pores. The pores formed by the extraction of soluble, inert, finely divided solid pore-forming agents, particularly where these materials have been swelled in situ, are known to be characterized by irregular contours presenting many sharp edges and facets. These irregularities in the pore surfaces increase the angle of contact between the penetrating liquid and the plastic thereby reducing the surface tension effects which ordinarily tend to promote the wetting of the plastic and penetration by the liquid. In this respect it is felt that the plasticization of the microporous material after the removal of the pore-former softens the plastic matrix thereby permitting strains and irregularities created therein by the pore-former to be relieved, providing more rounded and regular pore surface. It should be noted that this rounding or smoothing of the pores is achieved without any substantial increase in the pore size, thereby enhancing the liquid transmission properties of the material without substantially lessening its ability to retain solids or differentiate between liquids of different viscosities.

Other objects and advantages of the present invention will be readily apparent from the following detailed description of preferred embodiments thereof.

In carrying out one form of the present invention, microporous sheet material prepared in accordance with the process described in detail in the aforementioned Honey et al. patent is treated to enhance its liquid transmission properties. The specific sheet material tested was made by mixing one part by weight of finely divided polyvinyl chloride particles, 4 parts by weight of finely divided starch and 1 part by weight of isophorone, the latter acting as a temporary plasticizer for the polyvinyl chloride. Following the mixing of the ingredients the mixture was extruded to form sheet material 0.010" thick and the isophorone removed therefrom by means of evaporation. The sheet material thus produced was then passed through boiling water to swell the starch. Following this swelling operation the starch was removed in a bath of sulfuric acid leaving the polyvinyl chloride sheet microporous.

Samples of the sheet material described above were then treated with a solvent to assure the removal of any residual plasticizer. It should be understood that this step was carried out to assure that the removal of the residual plasticizer used in making the porous sheet is not the step in the process to which the enhanced liquid transmission properties of the treated material can be attributed. Specifically, for this treatment, the sheet material was placed in a Soxhlet extractor and methanol refluxed therethrough ten times. Following this methanol treatment, the samples were removed from the extractor and dried for one-half hour at 80° C. in a circulating hot air oven to remove the methanol. This treatment produced microporous polyvinyl chloride sheets completely free of residual plasticizer, the material being characterized by the high degree of rigidity peculiar to polyvinyl chloride.

The sheet material was next plasticized by means of a bath of an emulsified plasticizer. The specific plasticizer utilized was prepared by adding 5 grams of a non-ionic emulsifier, specifically an adduct of ethylene oxide and phenol, to 100 grams of an epoxydized coconut oil. To this mixture there was added a mixture of 2 grams of triethanolamine and 100 grams of water, the addition being made slowly and with constant stirring until inversion occurred. After the inversion, the water-triethanolamine solution was added with greater rapidity and mixed by stirring. The microporous sheet was then soaked for one-half hour in the emulsified plasticizer after which it was removed and washed in tap water. Following the washing, the plasticized material was dried in a circulating hot air oven for one-half hour at 80° C. It should be noted that this drying step aids in promoting the uniform diffusion of the plasticizer into the microporous plastic matrix.

Following the drying of the plasticized sheet material it was re-inserted in the Soxhlet extractor and again treated with methanol as described above to extract the plasticizer. Following the removal of the plasticizer by means of the methanol the material was removed from the extractor and again dried in a circulating air oven for a period of one-half hour. The oven was heated to a temperature of 80° C. for this drying operation. The material once again has the rigid properties characteristic of unplasticized polyvinyl chloride.

The material thus produced was then tested to determine its air transmission, water vapor transmission and water transmission properties and these properties were compared to those of the untreated material which was substantially identical to those of the methanol extracted material prior to post-plasticizing. The air transmission test was performed by applying a pressure differential of 4" of water across a 2¼" diameter section of the material held rigidly in a mounting member. The air flow therethrough was then measured by means of a gas flow meter. The water vapor transmission test utilized was carried out in accordance with ASTM specifications E–96 (temporary specification 1953) for material in sheet form. To measure the water transmission properties of the material, a 4-ft. head of water was applied to the material mounted at the base of a glass tube, 8 mm. in diameter. Water from this 4-ft. head was then permitted to flow through the material and measurements were made during the period required for the head to drop from 3 feet to 2 feet. The results of comparative tests are noted below in Table I.

Table I

|  | Air Transmission, l./min./cm.$^2$ | Water Vapor Transmission, g./24 hrs./cm.$^2$ | Water Transmission, ml./min./cm.$^2$ |
| --- | --- | --- | --- |
| Untreated Material | 0.310 | 0.130 | 0.0515 |
| Treated Material | 0.350 | 0.133 | 0.938 |

The result given in Table I are values averaged for a number of samples and as can be seen the air transmission properties and the water vapor transmission properties of the treated and untreated material are substantially the same. This is interpreted as indicating that the post-plasticization treatment did not in any way enlarge the pores of the treated material. The water transmission properties of the treated material are approximately 18 times greater than those of the untreated material. As discussed hereinbefore, this is attributed to a rounding and smoothing of the pore surfaces thereby contributing to the better wetting of the pore surfaces by the penetrating liquid.

In considering the present invention, it should be understood that the choice of plasticizer and method of plasticization of the microporous material is governed solely by the convenience and control which can be exercised over the degree of plasticization achieved and forms no part of the present invention. In the particular example presented hereinbefore, an emulsion type plasticizer was chosen because of the high degree of control of plasticizer concentration inherent in such a system. It should be understood however, that the plasticizer may be applied by means of an atomizer, which type of plasticization is particularly adapted to porous plastic material, or it can be applied from solution. In addition, other plasticizers both of the permanent and temporary type may be utilized as for example, isophorone, dioctyl phthalate, tricresyl phosphate, diisodecyl phthalate, di(n-octyl, n-decyl) phthalate, dioctyl adipate, cyclohexanone, methylcyclohexanone and chlorobenzene.

The teachings of the present invention are also applicable to other types of microporous vinyl chloride resins and their copolymers, particularly the copolymers of vinyl chloride with vinyl acetate and vinyl alcohol. As can be seen from the foregoing, by means of the present invention there is provided means for adapting microporous materials of this type to filtering applications where they are inherently adapted due to their unique chemical corrosion resistance, but have heretofore been unsuited because of their poor liquid transmission properties.

Having described the present invention, that which is claimed as new is:

1. In a process for producing an improved microporous resin selected from the group consisting of polyvinyl chloride and copolymers of vinyl chloride with vinyl acetate and vinyl alcohol which has been rendered microporous by mixing it with a temporary plasticizer and a soluble, inert, finely divided pore-forming agent, removing the temporary plasticizer and extracting the pore-forming agent, the improvement which comprises post-plasticizing the microporous resin by contacting it with a plasticizer after the pore-forming agent has been removed and subsequently removing the plasticizer from the microporous resin.

2. In a process for producing an improved microporous resin selected from the group consisting of polyvinyl chloride and copolymers of vinyl chloride with vinyl acetate and vinyl alcohol which has been rendered microporous by mixing it with a temporary plasticizer and finely divided starch to produce a plasticized mass, extruding the mass to produce sheet material, removing the temporary plasticizer from the sheet material and leaching the starch from the sheet material, the improvement which comprises post-plasticizing the microporous resin sheet material by contacting it with a plasticizer after the pore-forming agent has been removed and subsequently removing the plasticizer from the microporous resin sheet material.

3. In a process for producing an improved microporous polyvinyl chloride resin which has been rendered microporous by mixing it with a temporary plasticizer and a soluble, inert, finely divided pore-forming agent, removing the temporary plasticizer and extracting the pore-forming agent, the improvement which comprises post-plasticizing the microporous polyvinyl chloride resin by contacting it with a plasticizer after the pore-forming agent has been removed and subsequently removing the plasticizer from the microporous polyvinyl chloride resin.

References Cited in the file of this patent
UNITED STATES PATENTS

| | | |
|---|---|---|
| 2,542,527 | Honey et al. | Feb. 20, 1951 |
| 2,772,322 | Witt et al. | Nov. 27, 1956 |